United States Patent
Chomiak

(10) Patent No.: US 6,463,890 B1
(45) Date of Patent: Oct. 15, 2002

(54) COMBINED DIESEL-RANKINE CYCLE RECIPROCATING ENGINE

(75) Inventor: Jerzy Chomiak, Göteborg (SE)

(73) Assignee: Wartsila NSD Oy AB, Helsinki (FI)

( * ) Notice: Subject to any disclaimer, the term of this patent is extended or adjusted under 35 U.S.C. 154(b) by 0 days.

(21) Appl. No.: 09/600,650
(22) PCT Filed: Jan. 19, 1999
(86) PCT No.: PCT/SE99/00074
§ 371 (c)(1), (2), (4) Date: Jul. 19, 2000
(87) PCT Pub. No.: WO99/37904
PCT Pub. Date: Jul. 29, 1999

(30) Foreign Application Priority Data

Jan. 23, 1998 (SE) .............................. 9800191

(51) Int. Cl.⁷ ............................................... F02B 47/02
(52) U.S. Cl. .................................................... 123/25 P
(58) Field of Search ............................. 123/25 B, 25 C, 123/25 D, 25 F, 25 P, 543, 557, 304, 305, 298, 299, 300

(56) References Cited

U.S. PATENT DOCUMENTS

| 1,767,701 A | * | 6/1930 | Riehm ........................ 123/304 |
| 3,672,341 A | * | 6/1972 | Smith et al. ................. 123/536 |
| 3,682,142 A | * | 8/1972 | Newkirk ........................ 123/3 |
| 3,717,129 A | * | 2/1973 | Fox ............................ 123/1 A |
| 3,763,832 A | * | 10/1973 | Fenne ...................... 123/25 C |
| 3,968,775 A | * | 7/1976 | Harpman .................. 123/25 B |
| 4,300,353 A | * | 11/1981 | Ridgway ....................... 60/618 |
| 4,368,711 A | * | 1/1983 | Allen .......................... 123/522 |
| 4,402,182 A | | 9/1983 | Miller .......................... 60/712 |
| 4,406,127 A | * | 9/1983 | Dunn ............................ 60/618 |
| 4,409,932 A | | 10/1983 | Gill ........................... 123/25 D |
| 4,499,862 A | * | 2/1985 | Baumer et al. .............. 123/1 A |
| 4,509,464 A | * | 4/1985 | Hansen ....................... 123/1 A |
| 4,515,135 A | * | 5/1985 | Glass .......................... 123/557 |
| 4,612,898 A | * | 9/1986 | Steiger et al. ............... 123/299 |
| 4,909,192 A | | 3/1990 | Förster et al. ............ 123/25 C |
| 4,919,093 A | * | 4/1990 | Hiraki et al. ................ 123/299 |
| 5,035,227 A | * | 7/1991 | Hansen ........................ 123/557 |
| 5,099,802 A | * | 3/1992 | Forster ..................... 123/25 F |
| 5,170,751 A | * | 12/1992 | Tosa et al. ................ 123/25 C |
| 5,522,349 A | * | 6/1996 | Yoshihara et al. ......... 123/25 C |
| 6,095,100 A | * | 8/2000 | Hughes ..................... 123/25 C |
| 6,112,705 A | * | 9/2000 | Nakayama et al. ....... 123/25 C |
| 6,170,441 B1 | * | 1/2001 | Haldeman et al. ......... 123/25 D |

FOREIGN PATENT DOCUMENTS

| DE | 33 33 069 | 3/1985 |
| DE | 4000376 | * 11/1991 |
| DE | 43 03 692 | 8/1994 |
| GB | 206185 | 11/1923 |

* cited by examiner

Primary Examiner—Willis R. Wolfe
Assistant Examiner—Hai Huynh
(74) Attorney, Agent, or Firm—John Smith-Hill; Smith-Hill and Bedell

(57) ABSTRACT

A Diesel engine in which a boiler is installed to extract heat from cylinder and air cooling systems as well as exhaust gases to generate steam at a rate proportional to the fuel flow and in which means are provided for introduction of the steam into the cylinder close to top dead center separately from the fuel, before during and after combustion, so that the steam injection does not disturb the ignition but actively modifies the combustion and afterburning process. The ratio of the steam to the fuel mass is preferably 1:1 to 3:1 and the steam temperature and pressure is as high as allowed by the properties of the materials used in the steam generating equipment. The steam system is adaptable to large Diesel engines and results in strongly reduced fuel consumption and very low pollutant emissions.

15 Claims, 2 Drawing Sheets

COMBINED DIESEL-RANKINE CYCLE RECIPROCATING ENGINE

TECHNICAL FIELD

The invention relates to a piston reciprocating thermal engine where compression ignition, limited pressure (Diesel) and steam (Rankine) cycles are realized using the same cylinders at the same time.

BACKGROUND OF THE INVENTION

In limited pressure compression ignition (Diesel) engines liquid fuel is injected into the compressed air in the cylinders. The bulk of combustion occurs on the stoichiometric surface of a diffusion flame separating the high temperature oxygen rich and high temperature fuel rich regions. The presence of the high temperature oxygen rich zones leads to production of large amounts of nitrogen oxides ($NO_x$) and the presence of the high temperature fuel rich zones to soot (particulate matter) production. Thus Diesel engines are regarded by some as being highly polluting. The additional feature of the engines is that the exhaust gases are hot and the air and cylinder walls require cooling which causes substantial heat losses decreasing the thermal efficiency of the engines. In Rankine cycle (steam) engines water is evaporated by heating and the generated steam used to produce mechanical energy. Diesel-Rankine cycle combination is often used to utilize the waste heat of the Diesel (top) engine but the Rankine cycle is typically realized in a separate (bottom) engine. An example of such solution is described for instance in the U.S. Pat. No. 5,133,298. Clearly this is a relatively expensive and potentially difficult solution.

In a number of patents for instance: U.S. Pat. Nos. 4,377,934; 4,406,127; 4,706,468; and U.S. Pat. No. 4,901,531 different versions of the bottom steam cycle are proposed in which at least one cylinder of the internal combustion engine is used as the steam power recovery device, which in fact is a modification of the classic combined cycle engines. In another patent: U.S. Pat. No. 4,433,548 the use of the same cylinders alternatively for combustion and steam power strokes is described. In yet another patent: U.S. Pat. No. 4,409,932 injection of the steam during the power stroke i.e. after combustion in a gasoline car engine is proposed. A negative feature of all these solutions is that the emissions of the combined systems are the same as for the internal combustion (top) engine. Many patents for example U.S. Pat. Nos. 3,761,019; 4,014,299; 4,027,630; 4,059,078; 4,391,229; 4,409,931; 4,844,028 describe steam injection into the inlet manifold of engines to control power, knock or $NO_x$. However these solutions do not necessarily provide increased efficiency. Some patents: U.S. Pat. Nos. 3,948,235 and 4,913,098 propose to supercharge the engine using the steam either by a steam driven compressor or compressor and ejector. The efficiency increase of the solutions is relatively small so as it is for the solutions described in U.S. Pat. Nos. 4,301,655 and 4,402,182 where special cylinder heads where steam can be evaporated and injected into the engines are described since in these solutions only the cylinder head cooling heat is utilized in the power stroke. Premixing the fuel with water, vaporizing the mixture and using the evaporated homogeneous steam-fuel mixture as a modified fuel are described in the U.S. Pat. No. 4,909,192. However, to realize the full potential of the system the steam fuel mass ratio shall be in the range 1:3 and the steam temperature above 500° C. The massive steam injection in the premixed mode can cause severe ignition problems whereas preheating of the fuel to the temperatures required even in the presence of water may lead to substantial fuel decomposition and coke formation in the fuel/steam system. Thus the solution does not seem to be feasible especially for heavy fuel operation.

SUMMARY OF THE INVENTION

The aforementioned goal is achieved using as much as possible of the waste heat i.e. the air and cylinder cooling heat including cylinder head cooling as well as the exhaust of the internal combustion (Diesel) engine to generate steam which is then injected back into the cylinders of the internal combustion (Diesel) engine close to the top dead center so, that the steam actively changes the combustion process without interfering with the ignition. In this way the maximum potential of the Diesel-Rankine cycle combination is achieved using the same cylinders and reciprocating mechanisms at the same time. This simplifies and reduces substantially the cost of the system. In addition the maximum temperatures in the cylinders obtained during the fully developed combustion are reduced which radically decreases $NO_x$ emissions and the mixing of combustion gases with remaining air enhanced during afterburning which reduces soot emissions. To achieve the goals of the invention over a range of engine loads the rate of water injection into the steam generating apparatus should be proportional to the average fuel flow, which maintains the proper engine power and steam mass injection balance. In another embodiment a small part of the steam, typically less than 10% of the fuel mass, is used for rapid atomization of fuel without using expensive pressure fuel injection systems.

Thus the invention provides a simple yet effective solution to long standing problems of the combined Diesel-Rankine cycle engines. The foregoing and other objects and advantages of this invention will appear from the following detailed description, taken in connection with the accompanying drawings of a preferred embodiment.

DESCRIPTION OF THE PREFERRED EMBODIMENT

Figure 1:
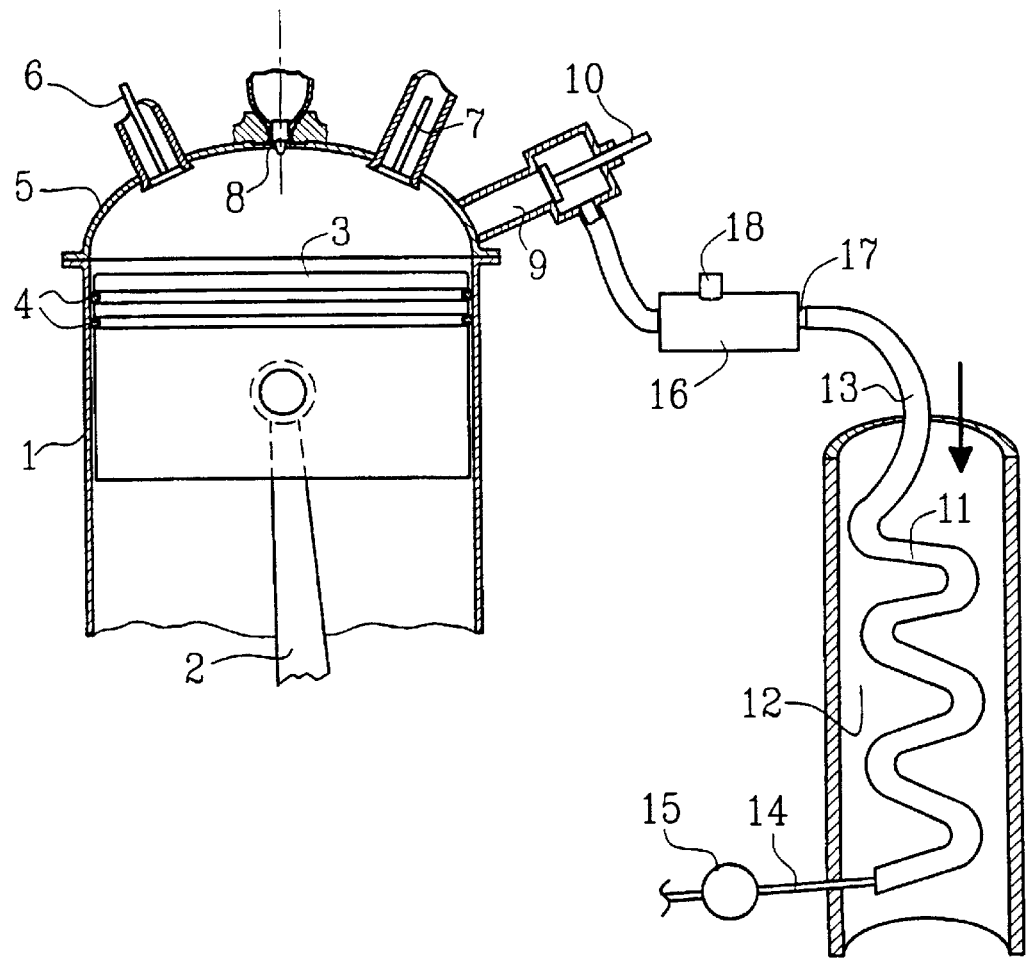
FIG. 1 is a fragmentary view in a schematic form of a cylinder of a Diesel engine and engine embodying the features of this invention, the components being arranged to depict the fuel and steam injection stage of the operating combined engine.

For simplicity of description, the drawings illustrate one cylinder of an engine which may include any desired number of cylinders. As illustrated in FIG. 1 the engine contains a cylinder 1 in which a piston 3 is shown connected in a conventional manner by a connection rod 2 to a crank shaft from which output power is to be taken. The piston is sealed by piston rings 4 and the cylinder is closed by a cylinder head 5 in which an inlet valve 6, outlet valve 7, fuel injection apparatus 8 and steam inlet 9 are located. The steam inlet is controlled by a steam injected valve 10 admitting steam at a selected time close to top dead center before, during and after combustion. The steam is generated in a boiler 12 shown symbolically in which steam tubes 11 and steam collector 13 are located. The boiler uses heat from hot water used for cylinder wall and cylinder head cooling as well as inlet air cooling and exhaust gases. Water is pumped into the boiler through a water pipe 14 by a pump 15 at a rate proportional to fuel pumping rate. The pressure of steam is controlled by the rate at which the water is supplied and time of injection. A small control volume 16 is provided before the steam inlet valve to which the steam enters through a flow restriction 17. Opening of the steam valve 10 causes a pressure drop in the control volume 16 which is measured by a pressure sensor 18. Monitoring the pressure drop will provide necessary information about operation of the valve. In particular sluggish operation or seizure of the steam injection valves and steam leakages to cylinders can be detected in this way.

Figure 2:
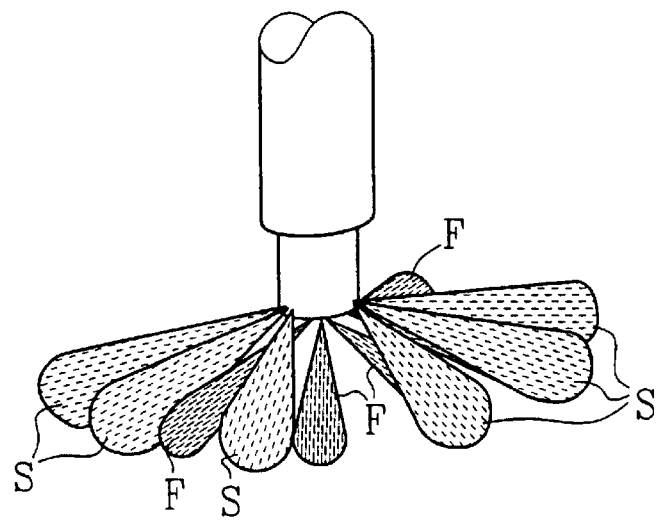
FIG. 2 is a fragmentary view of the steam (S) and fuel (F) jets when a common injection system is used.
Figure 3:
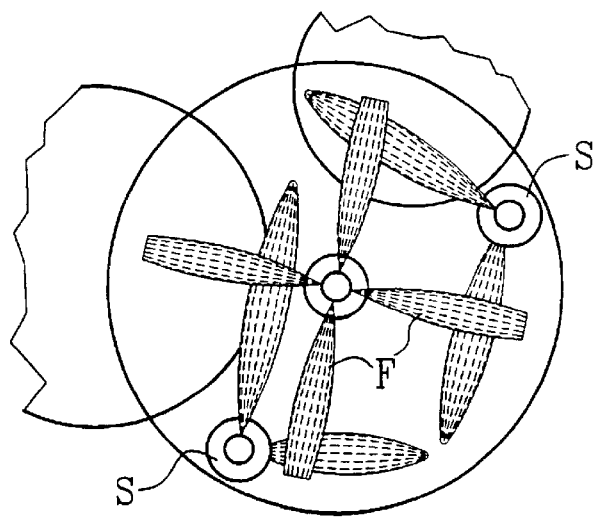
FIG. 3 is a fragmentary view of the steam (S) injection at a different level to the fuel (F) sprays.
Figure 5:
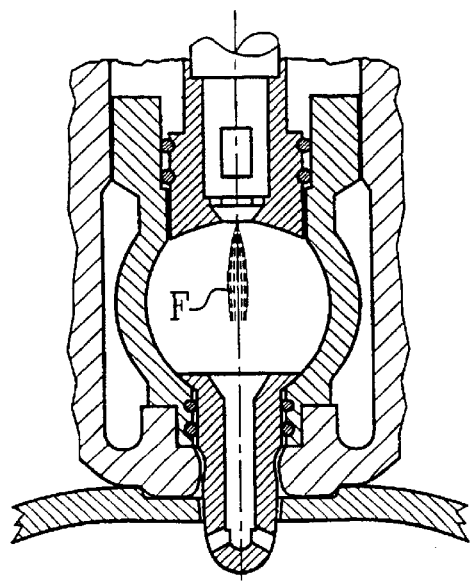
FIG. 5 is a fragmentary view of the prechamber for initial combustion of fuel (F) substituting for the direct fuel injection system 8 of FIG. 1.
Figure 4:
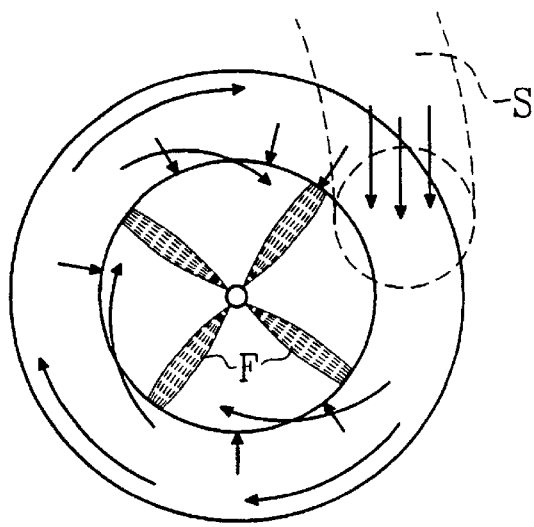
FIG. 4 is a fragmentary view of the steam (S) injection at the periphery of the cylinder in the direction tangential to the wall.

In the simplest way the present invention can be realized using a Diesel engine designed for dual-liquid/gas-fuel operation. In such a solution, liquid fuel (F) is injected separately through the standard injection system whereas the steam (S) is injected through the injectors for gas fuel. This is shown in FIG. 2 where the separate fuel (F) and steam (S) jets are shown. In another solution shown in FIG. 3 the steam (S) is injected at the bottom of the combustion chamber below the fuel (F) jets. In both cases the injector timing is arranged in such a way that the injection of steam does not interfere with the fuel injection until ignition is achieved. In another system shown in FIG. 4 the injection of steam (S) is realized at the cylinder periphery tangentially to the cylinder wall. The injection creates a rapidly swirling layer of steam. The inertia forces (radial acceleration) keep the steam at the periphery and prevent the steam-air mixing until ignition occurs. Then due to the strong perturbation of steam layer by the pressure pulse created by ignition the steam layer will loose stability and will very quickly mix with the gas. As the combustion process at this moment will be already fully developed the mixing will not do any harm to it but at the same time will be instrumental in the $NO_x$ and soot emission control. Yet another way to practically realize the invention is by dividing the combustion chamber of the Diesel engine into two parts: one for ignition and first stage combustion where no steam is admitted and the other where the steam is injected and afterburning of the partially reacted fuel from the first stage occurs in steam-air mixture. This is illustrated in FIG. 5 where only the prechamber is shown replacing the fuel injection system 8 in FIG. 1. In the last two cases the steam may be injected long time before the fuel as the ignition will not be perturbed by the steam.

Yet another system uses a small amount of the steam, typically less than 10% to blast inject, and atomize the fuel. The system can be likened to that used in early Diesel engines where compressed air was used to atomize the fuel. From the early Diesel engine developments it is known that the air blast injection systems work very well but compression of the air to very high pressures needed was a complicated and energy consuming process here replaced by steam blasting using waste engine heat for steam production i.e. as the primary energy source.

Whilst the invention has been described with reference to certain embodiments, it is to be understood that the invention is not limited to said embodiments and may be widely varied within the scope of the appended claims.

The ratio of water vapor mass to fuel mass is preferably 1:1 to 3:1, the temperature of steam below 580° C. and the pressure of steam below 180 bar. It can be shown that depending on the amount and parameters of steam the use of steam as described above can provide an increase of shaft thermal efficiency of the Diesel engines by a factor up to 1.32, reduce the $NO_x$ emissions by a factor up to 4 and substantially reduce soot emissions. The engines are particularly beneficial for high power, stationary and ship applications where heavy and residual fuels are burned and where space requirements for the auxiliary steam generation systems are not critical.

What is claimed is:

1. A method of operating a compression ignition (Diesel)-Rankine cycle reciprocating engine having at least one cylinder in which fuel is burned, a cooling system, and an exhaust system associated with the cylinder for conducting exhaust gases from said cylinder, said method comprising:
   removing heat from the cooling system and from the exhaust gases and employing such heat to generate steam, and
   introducing said steam into said cylinder,
   and wherein said steam and said fuel are introduced separately into said cylinder and interact after ignition of the fuel.

2. A method according to claim 1, comprising injecting the steam into the cylinder at the periphery of the cylinder and tangentially to the cylinder wall.

3. A method according to claim 1, comprising injecting the steam and the fuel through a common injector but in separate jets.

4. A method according to claim 3, wherein said separate jets have different injection angles.

5. A method according to claim 1, comprising injecting the steam and the fuel at different respective levels.

6. A method according to claim 1, comprising injecting the fuel into a separate chamber thereby preventing mixing prior to ignition.

7. A method according to claim 1, wherein the ratio of water vapor mass to fuel mass injected is in the range of 1:1 to 3:1.

8. A method according to claim 1, comprising superheating the steam prior to injection.

9. A method according to claim 1, comprising injecting a portion of the steam in a manner such as to inject and blast atomize the fuel.

10. A method according to claim 9, wherein said portion of the steam has a mass less than 10% of the fuel mass injected.

11. A method according to claim 1, comprising using an auxiliary heater to modify the steam parameters.

12. A method according to claim 11, comprising using the auxiliary heater to modify the steam parameters for superheated operation.

13. A combined compression ignition (Diesel)-Rankine cycle engine having at least one cylinder, a fuel injection means for introducing fuel into the cylinder, a cooling system, and an exhaust system associated with the cylinder for conducting exhaust gases from said cylinder, said engine comprising:
   a first means associated with the cooling system and the exhaust system for recovering heat therefrom,
   a second means for employing the recovered heat to generate steam, and
   a third means for introducing said steam into the cylinder separately from the fuel such that the steam interacts with the fuel after ignition of the fuel.

14. An engine according to claim 13, having a steam injection valve for controlling injection of steam into the cylinder, the engine further comprising a prechamber between the second means and the steam injection valve, the prechamber having a flow restriction orifice and a pressure monitoring system to control operation of the steam injection valve.

15. An engine according to claim 13, comprising means for generating steam at a rate proportional to the rate of fuel flow.

* * * * *